(12) United States Patent
Chretien et al.

(10) Patent No.: US 8,714,723 B2
(45) Date of Patent: May 6, 2014

(54) ROBUST CURABLE SOLID INKS AND METHODS FOR USING THE SAME

(75) Inventors: Michelle N. Chretien, Mississauga (CA); Marcel P. Breton, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 382 days.

(21) Appl. No.: 13/105,825

(22) Filed: May 11, 2011

(65) Prior Publication Data

US 2012/0287212 A1 Nov. 15, 2012

(51) Int. Cl.
*B41J 2/01* (2006.01)

(52) U.S. Cl.
USPC ............... 347/99; 347/88; 347/100; 347/102

(58) Field of Classification Search
USPC ......... 347/88, 99, 95, 96, 103, 100, 102, 101; 106/31.13, 31.6, 31.27; 523/160, 161
See application file for complete search history.

(56) References Cited

U.S. PATENT DOCUMENTS

| | | | |
|---|---|---|---|
| 4,490,731 A | 12/1984 | Vaught | |
| 5,195,430 A | 3/1993 | Rise | |
| 5,231,135 A | 7/1993 | Machell et al. | |
| 5,621,022 A | 4/1997 | Jaeger et al. | |
| 5,782,966 A | 7/1998 | Bui et al. | |
| 6,136,506 A * | 10/2000 | Hashimoto et al. | 430/280.1 |
| 6,221,137 B1 | 4/2001 | King et al. | |
| 6,309,453 B1 | 10/2001 | Banning et al. | |
| 6,472,523 B1 | 10/2002 | Banning et al. | |
| 6,476,219 B1 | 11/2002 | Duff et al. | |
| 6,576,747 B1 | 6/2003 | Carlini et al. | |
| 6,576,748 B1 | 6/2003 | Carlini et al. | |
| 6,590,082 B1 | 7/2003 | Banning et al. | |
| 6,646,111 B1 | 11/2003 | Carlini et al. | |
| 6,663,703 B1 | 12/2003 | Wu et al. | |
| 6,673,139 B1 | 1/2004 | Wu et al. | |
| 6,696,552 B2 | 2/2004 | Mayo et al. | |
| 6,713,614 B2 | 3/2004 | Carlini et al. | |
| 6,726,755 B2 | 4/2004 | Titterington et al. | |
| 6,755,902 B2 | 6/2004 | Banning et al. | |
| 6,821,327 B2 | 11/2004 | Jaeger et al. | |
| 6,958,406 B2 | 10/2005 | Banning et al. | |
| 7,053,227 B2 | 5/2006 | Jaeger et al. | |
| 7,186,762 B2 | 3/2007 | Wong et al. | |
| 7,276,614 B2 | 10/2007 | Toma et al. | |
| 7,279,587 B2 | 10/2007 | Odell et al. | |
| 7,381,831 B1 | 6/2008 | Banning et al. | |
| 7,427,323 B1 | 9/2008 | Birau et al. | |

(Continued)

OTHER PUBLICATIONS

U.S. Appl. No. 12/704,194, filed Feb. 11, 2010, Breton et al.

(Continued)

*Primary Examiner* — Manish S Shah
(74) *Attorney, Agent, or Firm* — Pillsbury Winthrop Shaw Pittman LLP

(57) ABSTRACT

Curable solid inks and low shrinkage curable solid inks which are solid at room temperature and molten at an elevated temperature at which the molten ink is applied to a substrate. In particular, the solid inks of the present embodiments retain the advantages of handling, safety, and print quality usually associated with conventional solid phase change inks but provide additional breakthrough performance characteristics such as enhanced curing and robustness, lower jetting temperature, and ultra-low shrinkage upon crystallization, which allow the inks to be used as novel materials in inkjet-based print applications.

18 Claims, 4 Drawing Sheets

(56) References Cited

U.S. PATENT DOCUMENTS

| | | |
|---|---|---|
| 7,559,639 B2 | 7/2009 | Belelie et al. |
| 2007/0120910 A1 | 5/2007 | Odell et al. |
| 2007/0123723 A1* | 5/2007 | Odell et al. .................. 564/152 |
| 2007/0142492 A1* | 6/2007 | Odell et al. .................... 522/74 |
| 2008/0000384 A1* | 1/2008 | Belelie et al. ............. 106/31.13 |
| 2008/0122914 A1 | 5/2008 | Toma et al. |
| 2008/0218540 A1 | 9/2008 | Iftime et al. |
| 2010/0055484 A1* | 3/2010 | Chretien et al. .......... 428/484.1 |
| 2010/0304040 A1 | 12/2010 | Chretien et al. |
| 2011/0262643 A1* | 10/2011 | Chopra et al. ............... 427/256 |
| 2012/0013690 A1* | 1/2012 | Breton et al. ................ 347/100 |
| 2012/0224011 A1* | 9/2012 | Chretien et al. ............. 347/102 |

OTHER PUBLICATIONS

U.S. Appl. No. 12/642,538, filed Dec. 18, 2009, Breton et al.
U.S. Appl. No. 12/703,817, filed Feb. 11, 2010, Breton et al.
U.S. Appl. No. 12/835,198, filed Jul. 13, 2010, Breton et al.
U.S. Appl. No. 13/105,090, filed May 11, 2011, Breton et al.
U.S. Appl. No. 12/972,138, filed Dec. 17, 2010, Breton et al.
U.S. Appl. No. 12/765,138, filed Apr. 22, 2010, Chopra et al.
Kirk-Othmer Encyclopedia of Chemical Technology, "Dimer Acids," vol. 8, ed. 4, pp. 223-237.

* cited by examiner

ROBUST CURABLE SOLID INKS AND METHODS FOR USING THE SAME

CROSS REFERENCE TO RELATED APPLICATIONS

Reference is made to commonly owned and co-pending, U.S. patent application Ser. No. 13/105,090, entitled "High Reactivity Curable Paste Ink Compositions" to Marcel P. Breton, et al., electronically filed on the same day herewith, the entire disclosure of which is incorporated herein by reference in its entirety.

BACKGROUND

The present embodiments relate to solid phase change ink compositions characterized by being solid at room temperature and molten at an elevated temperature at which the molten ink is applied to a substrate. These solid ink compositions can be used for ink jet printing in a variety of applications. The present embodiments are directed to curable solid inks (CSI) and low shrinkage curable solid inks (LS-CSI) and methods of using the inks. In the present embodiments, the curable solid ink is an ultraviolet (UV) curable ink with significant hardness prior to cure, and a substantial increase in hardness after curing which is resistant to solvent rub. The present embodiments thus have a unique combination of characteristics that provide curable solid inks with both desirable uncured solid state properties as well improved properties in the cured state.

Ink jet printing processes generally may employ inks that are solid at room temperature and liquid at elevated temperatures. Such inks may be referred to as solid inks, hot melt inks, phase change inks and the like. For example, U.S. Pat. No. 4,490,731, the disclosure of which is totally incorporated herein by reference, discloses an apparatus for dispensing solid ink for printing on a recording medium such as paper. In thermal ink jet printing processes employing hot melt inks, the solid ink is melted by the heater in the printing apparatus and utilized (jetted) as a liquid in a manner similar to that of conventional thermal ink jet printing. Upon contact with the printing recording medium, the molten ink solidifies rapidly, allowing the colorant to substantially remain on the surface of the recording medium instead of being carried into the recording medium (for example, paper) by capillary action, thereby enabling higher print density than is generally obtained with liquid inks. Advantages of a solid ink in ink jet printing are thus elimination of potential spillage of the ink during handling, a wide range of print density and quality, minimal paper cockle or distortion, reduced print-through and enablement of indefinite periods of nonprinting without the danger of nozzle clogging, even without capping the nozzles.

Solid inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in solid ink jet printers wherein the ink droplets are applied directly onto the final recording medium (for example, paper, transparency material, and the like), the droplets solidify immediately upon contact with the recording medium, so that migration of ink along the printing medium is prevented and dot quality is improved.

Curable solid inks were conceived as a means to use conventional solid ink print process, especially transfix, and deliver an increase in mechanical robustness after curing. One of the challenges in formulating a suitable curable solid ink is to create a solid ink with sufficient molecular mobility to allow rapid and extensive curing. Previous formulations have been disclosed in, such as for example, U.S. patent application Ser. No. 12/704,194 to Breton et al., which proposes use of an IGEPAL waxy derivative to increase cure speed. Reference is also made to U.S. application Ser. No. 12/642,538 to Breton et al., U.S. application Ser. No. 12/703,817 to Breton et al., and U.S. application Ser. No. 12/972,138 to Breton et al., the disclosures of which are totally incorporated herein by reference.

While the disclosed solid ink formulation provides some advantages over the prior formulations, there is still a need to achieve a formulation that provides a curable solid ink with more rapid and extensive curing and hardness. Thus, while the above conventional solid ink technology is generally successful in producing suitable solid inks, there is still a need for an improved curable solid ink that has increased curing speed and hardness after curing so that the resulting print is durable and can withstand much handling.

Each of the foregoing U.S. patents and patent Publications are incorporated by reference herein. Further, the appropriate components and process aspects of the each of the foregoing U.S. patents and patent Publications may be selected for the present disclosure in embodiments thereof.

SUMMARY

The present embodiments provide a curable solid ink comprising: a curable wax; one or more monomers; an optional colorant; an amide gellant; and a photoinitiator. In particular embodiments, the curable solid ink of claim 1 having a pre-cured hardness of from about 0.1 to about 0.5, and a post-cured hardness of from about 90 to about 95.

In further embodiments, there is provided a curable solid ink comprising: a curable wax; an optional non-curable component; one or more monomers; an optional colorant; an amide gellant; and a photoinitiator, wherein the curable solid ink has a hardness after curing of greater than 90 and a shrinkage value upon cooling from liquid state of less than about 3.

In other embodiments, there is provided a curable solid ink comprising: a curable wax; an optional non-curable component; one or more monomers; an optional colorant; an amide gellant; and a photoinitiator, wherein the amide gellant is a compound having the formula

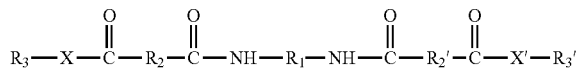

wherein $R_1$ is (i) an alkylene group, including linear and branched, saturated and unsaturated, cyclic and acyclic, and substituted and unsubstituted alkylene groups, and wherein heteroatoms either may or may not be present in the alkylene group, (ii) an arylene group, including substituted and unsubstituted arylene groups, and wherein heteroatoms either may or may not be present in the arylene group, (iii) an arylalkylene group, including substituted and unsubstituted arylalkylene groups, wherein the alkyl portion of the arylalkylene group can be linear or branched, saturated or unsaturated, and cyclic or acyclic, and wherein heteroatoms either may or may not be present in either the aryl or the alkyl portion of the arylalkylene group, or (iv) an alkylarylene group, including substituted and unsubstituted alkylarylene groups, wherein the alkyl portion of the alkylarylene group can be linear or branched, saturated or unsaturated, and cyclic or acyclic, and wherein heteroatoms either may or may not be present in either the aryl or the alkyl portion of the alkylarylene group, $R_2$ and $R_2'$ each, independently of the other, are (a) alkylene groups, including linear and branched, saturated and unsaturated, cyclic and acyclic, and substituted and unsubstituted alkylene groups, and wherein heteroatoms either may or may not be present in the alkylene group, (b) arylene groups, including substituted and unsubstituted arylene groups, and wherein heteroatoms either may or may not be present in the arylene group, (c) arylalkylene groups, including substituted and unsubstituted arylalkylene groups, wherein the alkyl portion of the arylalkylene group can be linear or branched, saturated or unsaturated, and cyclic or acyclic, and wherein heteroatoms either may or may not be present in either the aryl or the alkyl portion of the arylalkylene group, or (d) alkylarylene groups, including substituted and unsubstituted alkylarylene groups, wherein the alkyl portion of the alkylarylene group can be linear or branched, saturated or unsaturated, and cyclic or acyclic, and wherein heteroatoms either may or may not be present in either the aryl or the alkyl portion of the alkylarylene group, $R_3$ and $R_3'$ each, independently of the other, are either (a) photoinitiating groups, or (b) groups which are (1) alkyl groups, including linear and branched, saturated and unsaturated, cyclic and acyclic, and substituted and unsubstituted alkyl groups, and wherein heteroatoms either may or may not be present in the alkyl group, (2) aryl groups, including substituted and unsubstituted aryl groups, wherein heteroatoms either may or may not be present in the aryl group, (3) arylalkyl groups, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, or (4) alkylaryl groups, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, and X and X' each, independently of the other, is an oxygen atom or a group of the formula $NR_4$, wherein $R_4$ is (I) a hydrogen atom, (II) an alkyl group, including linear and branched, saturated and unsaturated, cyclic and acyclic, and substituted and unsubstituted alkyl groups, and wherein heteroatoms either may or may not be present in the alkyl group, (III) an aryl group, including substituted and unsubstituted aryl groups, and wherein heteroatoms either may or may not be present in the aryl group, (IV) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, or (V) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group.

In yet other embodiments, there is provided a method of jet printing an image, comprising: jetting a curable solid ink onto a print substrate to form an image; and exposing the image to radiation to cure the curable solid ink on to the print substrate, wherein the curable solid ink comprises: an ink vehicle, one or more waxes, and a photoinitiator, wherein the curable solid ink comprises a curable wax, an optional non-curable component, one or more monomers, an optional colorant, an amide gellant, and a photoinitiator, wherein the curable solid ink has a hardness after curing of greater than 90 and a shrinkage value upon cooling from liquid state of less than 3.

BRIEF DESCRIPTION OF THE DRAWINGS

For a better understanding of the present embodiments, reference may be had to the accompanying figures.

DETAILED DESCRIPTION

Figure 1:
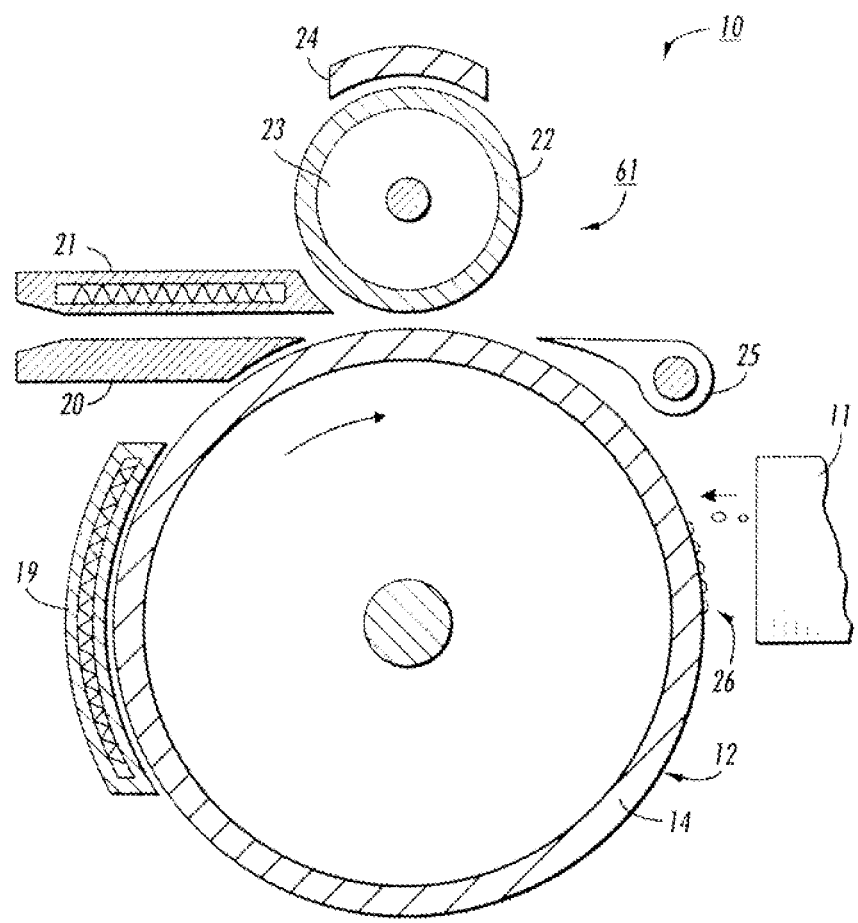
FIG. 1 is a side view of one apparatus for use in conjunction with the present embodiments.

In the following description, it is understood that other embodiments may be utilized and structural and operational changes may be made without departure from the scope of the present embodiments disclosed herein.

Solid ink technology broadens printing capability and customer base across many markets, and the diversity of printing applications will be facilitated by effective integration of printhead technology, print process and ink materials. The curable solid ink compositions are characterized by being solid at room temperature, for example, 20-50° C. or 20-27° C., and molten at an elevated temperature at which the molten ink is applied to a substrate. As discussed above, while current ink options are successful for printing on various substrates, there is still a need to achieve curable solid inks that provide increased curing speed and enhanced robustness and hardness upon curing.

The present embodiments are directed towards curable solid inks (CSI) and low shrinkage curable solid inks (LS-CSI), as disclosed in U.S. patent application Ser. Nos. 12/642,538; 12/704,194; and 12/835,198, which are hereby incorporated by reference in their entireties. In particular, the present embodiments provide curable solid inks and low shrinkage curable solid inks having a unique combination of characteristics for use as novel materials in inkjet-based print applications. The solid inks of the present embodiments retain the advantages of handling, safety, and print quality usually associated with solid phase change inks but provide additional breakthrough performance characteristics such as enhanced robustness, lower jetting temperature, and ultra-low shrinkage upon crystallization. For example, prepared solid inks of the present embodiments have even lower jetting temperatures than previously achieved, for example, jetting temperatures of from about 100 to about 70° C., or from about 100 to about 80° C., from about 90 to about 70° C. In particular, the present embodiments also provide faster phase change characteristics, excellent curing performance, increased hardness after curing, and low shrinkage characteristics. These inks are needed to address customers' needs for low energy, low Total Cost of Ownership (TCO) printing systems with high quality imaging characteristics.

The present embodiments provide novel low energy ultraviolet (UV) curable pigmented solid inks with high reactivity and minimum shrinkage. These inks contain a gellant additive and were formulated with viscosities in the range of less than 20 cPs at 90° C., or from about 20 to about 5 cPS at 90° C., or from about 15 to about 8 cPs at 90° C., and a shrinkage value of less than 3%, or from about 1 to about 3%. As used herein, the shrinkage value indicates the shrinkage of the ink upon cooling from a liquid state. In addition, these inks exhibit a hardness after curing much higher than conventional solid inks, such as those commercially available from Xerox Corporation or Océ North America. Significant improvements in curing rate and benchmarked hardness after curing was also shown for these inks as well as improved compatibility between components upon solidification. Extensive studies demonstrated that the concentration of non-curable resins should be less than 5 percent, or from about 1 to about 3 percent, or less than 1 percent by weight. Curing rates were obtained by plotting the hardness versus duration of exposure to UV light in s/ft (Fusions UV doped mercury D-bulb, 600 W/cm) and applying the following expressions:

$$y=m_1+m_2\cdot(1-\exp(-m_3\cdot x))$$

Initial Hardness=$m_1$

Initial Slope=$m_2\cdot m_3$

Final Hardness=$m_1+m_2$ where the initial slope is taken as the initial curing rate. The inks of the present embodiments display curing rates from about 130 to about 250 ft/s, such as from about 180 to about 250 ft/s or from about 200 to about 250 ft/s. Depending on the type of bulb used in the UV curable lamp, the characteristic output used for curing may be from about 200 nm to about 450 nm.

The present embodiments comprise blends of curable waxes, monomers, gellants, optional colorants, and free-radical photoinitiators, and optionally up to 5 percent by weight of non-curable resins, such as viscosity modifiers. The curable waxes, monomers, curable waxes, optional colorants, and free-radical photoinitiators are solid materials below about 40° C., or from below about 40 to below about 30° C., with little or no smell. These components were selected to achieve jetting at temperatures in the range of from about 70 to about 100° C., or from about 80 to about 100° C., or from about 70 to about 90° C. These solid inks thus have robust jetting at elevated temperatures with a viscosity of from about 5 to about 15 cPs, or from about 10 to about 15 cPs, or from about 8 to about 12 cPs at these temperatures, and are solid at room temperature which prevents excessive spreading or migration of the printed droplet on porous substrate. After printing, the compositions are cured to provide robust images.

The curable solid inks of the present embodiments have a pre-cured hardness of from about 0.1 to about 11 or of from about 0.1 to about 5, or of from about 0.1 to about 3. These inks have a post-cured hardness of from about 85 to about 100, or of from about 90 to about 97, or of from about 93 to about 97.

The curable solid components include monomers, curable waxes and gellants. The curable wax may be a solid at room temperature (25° C.). Inclusion of the wax may promote an increase in viscosity of the ink composition as the composition cools from the application temperature. The curable wax may be any wax component that is miscible with the other components and that will polymerize to form a polymer. The term wax includes, for example, any of the various natural, modified natural, and synthetic materials commonly referred to as waxes.

Suitable examples of curable waxes include waxes that include or are functionalized with curable groups. The curable groups may include, for example, an acrylate, methacrylate, alkene, allylic ether, epoxide, oxetane, and the like. These waxes can be synthesized by the reaction of a wax, such as a polyethylene wax equipped with a carboxylic acid or hydroxyl transformable functional group. The curable waxes described herein may be cured with the above isosorbide functionalized with at least one curable group and/or the additional curable monomer(s).

Suitable examples of hydroxyl-terminated polyethylene waxes that may be functionalized with a curable group include mixtures of carbon chains with the structure $CH_3$—$(CH_2)_n$—$CH_2OH$, where there is a mixture of chain lengths, n, where the average chain length can be in the range of about 16 to about 50, and linear low molecular weight polyethylene, of similar average chain length. Suitable examples of such waxes include, but are not limited to, the UNILIN series of materials such as UNILIN 350, UNILIN 425, UNILIN 550 and UNILIN 700 with $M_n$ approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Exemplary Guerbet alcohols include those containing about 16 to about 36 carbons, many of which are commercially available from Jarchem Industries Inc., Newark, N.J. PRIPOL® 2033 (C-36 dimer diol mixture including isomers of the formula

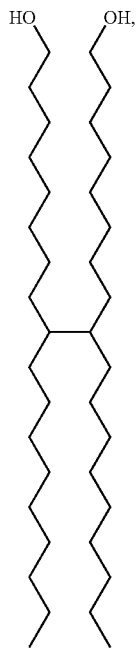

as well as other branched isomers that may include unsaturations and cyclic groups, available from Uniqema, New Castle, Del.; further information on $C_{36}$ dimer diols of this type is disclosed in, for example, "Dimer Acids," *Kirk-Othmer Encyclopedia of Chemical Technology*, Vol. 8, 4th Ed. (1992), pp. 223-237, the disclosure of which is totally incorporated herein by reference, may also be used. These alcohols can be reacted with carboxylic acids equipped with UV curable moieties to form reactive esters. Examples of these acids include acrylic and methacrylic acids, available from Sigma-Aldrich Co.

Suitable examples of carboxylic acid-terminated polyethylene waxes that may be functionalized with a curable group include mixtures of carbon chains with the structure $CH_3$—$(CH_2)_n$—COOH, where there is a mixture of chain lengths, n, where the average chain length is about 16 to about 50, and linear low molecular weight polyethylene, of similar average chain length. Suitable examples of such waxes include UNICID® 350, UNICID® 425, UNICID® 550 and UNICID® 700 with $M_n$ equal to approximately 390, 475, 565 and 720 g/mol, respectively. Other suitable waxes have a structure $CH_3$—$(CH_2)_n$—COOH, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Exemplary Guerbet acids include those containing 16 to 36 carbons, many of which are commercially available from Jarchem Industries Inc., Newark, N.J. PRIPOL® 1009 (C-36 dimer acid mixture including isomers of the formula

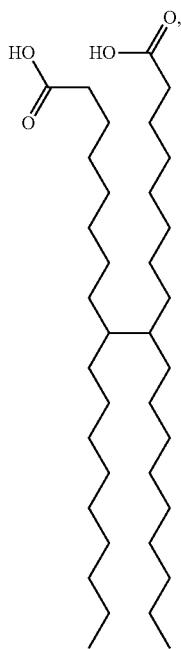 [SMILES: CCCCCCCCCC(CCCCCCCC(=O)O)C(CCCCCCCCC)CCCCCCCC(=O)O]

as well as other branched isomers that may include unsaturations and cyclic groups, available from Uniqema, New Castle, Del.; further information on $C_{36}$ dimer acids of this type is disclosed in, for example, "Dimer Acids," *Kirk-Othmer Encyclopedia of Chemical Technology*, Vol. 8, 4th Ed. (1992), pp. 223-237, the disclosure of which is totally incorporated herein by reference. These carboxylic acids can be reacted with alcohols equipped with UV curable moieties to form reactive esters. Examples of these alcohols include, but are not limited to, 2-allyloxyethanol from Sigma-Aldrich Co.;

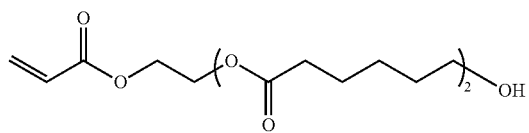

SR495B from Sartomer Company, Inc. (Exton, Pa.); and

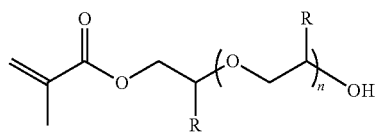

CD572 (R═H, n=10) and SR604 (R═Me, n=4) from Sartomer Company, Inc.

The curable wax can be included in the composition in an amount of from, for example, about 0.1% to about 30% by weight of the composition, such as from about 0.5% to about 20% or from about 0.5% to 15% by weight of the composition.

The monomers that may be used in the present embodiments are, in embodiments, those described in U.S. Pat. No. 7,559,639, which is hereby incorporated by reference. For example, the monomer may be a dimethanol diacrylate cyclohexane difunctional monomer, such as for example, CD-406 from Sartomer (mp=78° C.); an isocyanurate triacrylate trifunctional monomer, such as for example, SR-368 from Sartomer (mp=50-55° C.); a behenyl acrylate monofunctional mionomer C18,C20,C22 mixture, such as for example, CD587 from Sartomer (mp=55° C.); an acrylate curable monofunctional acrylate wax C22,C23,C24 mixture, such as for example, UNILIN 350 from Baker Petrolite (Houston, Tex.) (mp=78-83° C.); and a curable amide gellant. The gellants suitable for use in the radiation curable solid ink of the present embodiments include a gellant comprised of a curable amide, a curable polyamide-epoxy acrylate component, a polyamide component, mixtures thereof and the like. In further embodiments, a curable composite gellant may be comprised of a curable epoxy resin and a polyamide resin, mixtures thereof and the like. The gellant may also participate in the curing of monomer(s) in the composition. The gellants suitable for use in the solid inks may be amphiphilic in nature in order to improve wetting when the ink composition is utilized over a substrate having silicone or other oil thereon. Amphiphilic refers to molecules that have both polar and non-polar parts of the molecule. For example, the gellants may have long non-polar hydrocarbon chains and polar amide linkages.

Amide gellants suitable for use include those described in U.S. Patent Application Publication No. 2008/0122914 and U.S. Pat. Nos. 7,276,614 and 7,279,587, the entire disclosures of which are incorporated herein by reference. However, unlike the present embodiments, which are solid curable inks at room temperature both in the presence and absence of a gellant, the above patents are directed to liquid curable inks. In specific embodiments, the gellant is a mixture of components that also includes both curable and non-curable gellants.

In embodiments, the solid inks are formulated with a gellant material. Gellants suitable for use in the ink compositions include a gellant comprised of a curable amide, a curable polyamide-epoxy acrylate component and a polyamide component, a curable composite gellant comprised of a curable epoxy resin and a polyamide resin, mixtures thereof and the like, as disclosed in U.S. patent application Ser. No. 12/474, 946, which is hereby incorporated herein by reference in its entirety. The gellant may also participate in the curing of monomer(s) of the composition.

The gellants suitable for use in the composition may be amphiphilic in nature in order to improve wetting when the composition is utilized over a substrate having silicone or other oil thereon. Amphiphilic refers to molecules that have both polar and non-polar parts of the molecule. For example, the gellants may have long non-polar hydrocarbon chains and polar amide linkages. Amide gellants suitable for use include those described in U.S. Patent Application Publication No. 2008/0122914 and U.S. Pat. Nos. 7,276,614 and 7,279,587, the entire disclosures of which are incorporated herein by reference. Additional gellants suitable for use also include those described in U.S. patent application Ser. No. 12/765, 148 to Chopra et al. filed on Apr. 22, 2010.

As described in U.S. Pat. No. 7,279,587, the amide gellant may be a compound of the formula

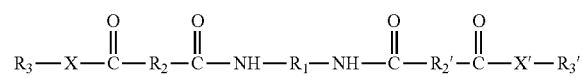

wherein:

$R_1$ is:
(i) an alkylene group (wherein an alkylene group is a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group) having from about 1 carbon atom to about 12 carbon atoms, such as from about 1 carbon atom to about 8 carbon atoms or from about 1 carbon atom to about 5 carbon atoms,
(ii) an arylene group (wherein an arylene group is a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group) having from about 1 carbon atom to about 15 carbon atoms, such as from about 3 carbon atoms to about 10 carbon atoms or from about 5 carbon atoms to about 8 carbon atoms,
(iii) an arylalkylene group (wherein an arylalkylene group is a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group) having from about 6 carbon atoms to about 32 carbon atoms, such as from about 6 carbon atoms to about 22 carbon atoms or from about 6 carbon atoms to about 12 carbon atoms, or
(iv) an alkylarylene group (wherein an alkylarylene group is a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group) having from about 5 carbon atoms to about 32 carbon atoms, such as from about 6 carbon atoms to about 22 carbon atoms or from about 7 carbon atoms to about 15 carbon atoms, wherein the substituents on the substituted alkylene, arylene, arylalkylene, and alkylarylene groups can be halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are:
(i) alkylene groups having from about 1 carbon atom to about 54 carbon atoms, such as from about 1 carbon atom to about 48 carbon atoms or from about 1 carbon atom to about 36 carbon atoms,
(ii) arylene groups having from about 5 carbon atoms to about 15 carbon atoms, such as from about 5 carbon atoms to about 13 carbon atoms or from about 5 carbon atoms to about 10 carbon atoms,
(iii) arylalkylene groups having from about 6 carbon atoms to about 32 carbon atoms, such as from about 7 carbon atoms to about 33 carbon atoms or from about 8 carbon atoms to about 15 carbon atoms, or
(iv) alkylarylene groups having from about 6 carbon atoms to about 32 carbon atoms, such as from about 6 carbon atoms to about 22 carbon atoms or from about 7 carbon atoms to about 15 carbon atoms, wherein the substituents on the substituted alkylene, arylene, arylalkylene, and alkylarylene groups may be halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, and wherein two or more substituents may be joined together to form a ring;

$R_3$ and $R_3'$ each, independently of the other, are either:
(a) photoinitiating groups, such as groups derived from 1-(4-(2-hydroxyethoxy)phenyl)-2-hydroxy-2-methylpropan-1-one, of the formula

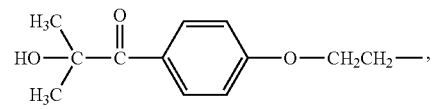

groups derived from 1-hydroxycyclohexylphenylketone, of the formula

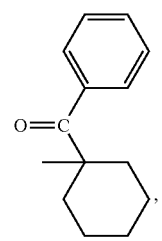

groups derived from 2-hydroxy-2-methyl-1-phenylpropan-1-one, of the formula

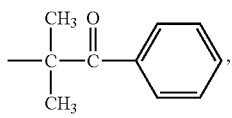

groups derived from N,N-dimethylethanolamine or N,N-dimethylethylenediamine, of the formula

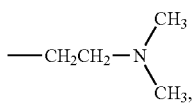

or the like, or:
  (b) a group which is:
  (i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group) having from about 2 carbon atoms to about 100 carbon atoms, such as from about 3 carbon atoms to about 60 carbon atoms or from about 4 carbon atoms to about 30 carbon atoms,
  (ii) an aryl group (including substituted and unsubstituted aryl groups, and wherein heteroatoms, such as oxygen, nitrogen, sulfur, silicon, phosphorus, boron, and the like either may or may not be present in the aryl group) having from about 5 carbon atoms to about 100 carbon atoms, such as from about 5 carbon atoms to about 60 carbon atoms or from about 6 carbon atoms to about 30 carbon atoms, such as phenyl or the like,
  (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group) having from about 5 carbon atoms to about 100 carbon atoms, such as from about 5 carbon atoms to about 60 carbon atoms or from about 6 carbon atoms to about 30 carbon atoms, such as benzyl or the like, or
  (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group) having from about 5 carbon atoms to about 100 carbon atoms, such as from about 5 carbon atoms to about 60 carbon atoms or from about 6 carbon atoms to about 30 carbon atoms, such as tolyl or the like,
  wherein the substituents on the substituted alkyl, arylalkyl, and alkylaryl groups may be halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring; and X and X' each, independently of the other, is an oxygen atom or a group of the formula —$NR_4$—, wherein $R_4$ is:
  (i) a hydrogen atom;
  (ii) an alkyl group, including linear and branched, saturated and unsaturated, cyclic and acyclic, and substituted and unsubstituted alkyl groups, and wherein heteroatoms either may or may not be present in the alkyl group, having from about 5 carbon atoms to about 100 carbon atoms, such as from about 5 carbon atoms to about 60 carbon atoms or from about 6 carbon atoms to about 30 carbon atoms,
  (iii) an aryl group, including substituted and unsubstituted aryl groups, and wherein heteroatoms either may or may not be present in the aryl group, having from about 5 carbon atoms to about 100 carbon atoms, such as from about 5 carbon atoms to about 60 carbon atoms or from about 6 carbon atoms to about 30 carbon atoms,
  (iv) an arylalkyl group, including substituted and unsubstituted arylalkyl groups, wherein the alkyl portion of the arylalkyl group may be linear or branched, saturated or unsaturated, and cyclic or acyclic, and wherein heteroatoms either may or may not be present in either the aryl or the alkyl portion of the arylalkyl group, having from about 5 carbon atoms to about 100 carbon atoms, such as from about 5 carbon atoms to about 60 carbon atoms or from about 6 carbon atoms to about 30 carbon atoms, or
  (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, having from about 5 carbon atoms to about 100 carbon atoms, such as from about 5 carbon atoms to about 60 carbon atoms or from about 6 carbon atoms to about 30 carbon atoms,
  wherein the substituents on the substituted alkyl, aryl, arylalkyl, and alkylaryl groups may be halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring.

Specific suitable substituents and gellants of the above are further set forth in U.S. Pat. Nos. 7,279,587 and 7,276,614, incorporated herein by reference in their entireties, and thus are not further detailed herein.

In embodiments, the gellant may comprise a mixture comprising:

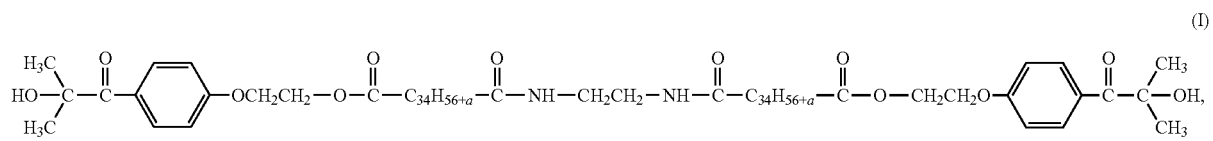# (I)

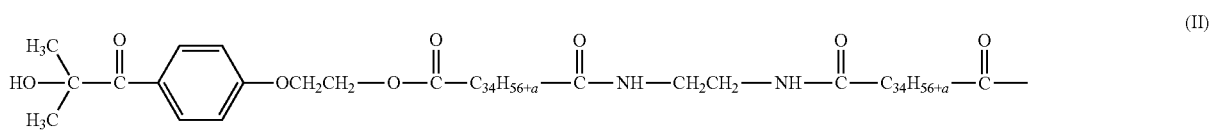# (II)

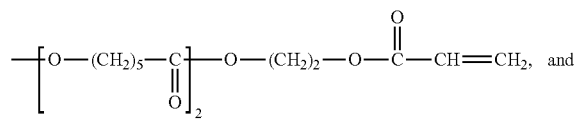

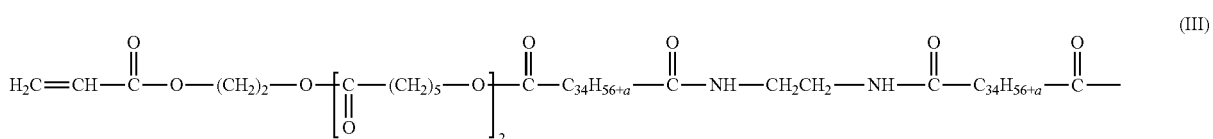# (III)

wherein —$C_{34}H_{56+a}$— represents a branched alkylene group which may include unsaturations and cyclic groups, wherein the variable "a" is an integer from 0-12.

In embodiments, the gellant may be one of the aromatic end-capped gellants described in U.S. patent application Ser. No. 12/765,148 to Chopra et al. filed on Apr. 22, 2010, which is hereby incorporated by reference in its entirety.

In embodiments, the gellants of the ink may be compounds with the following general structures

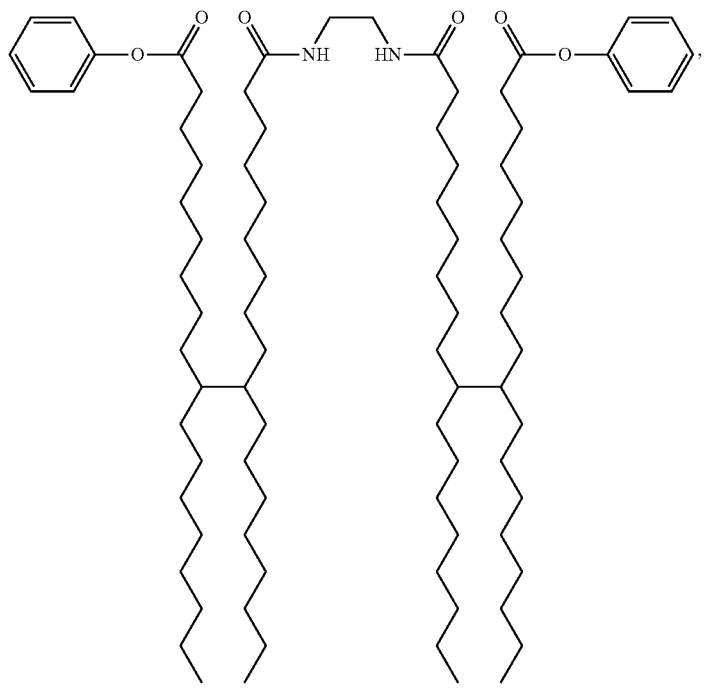

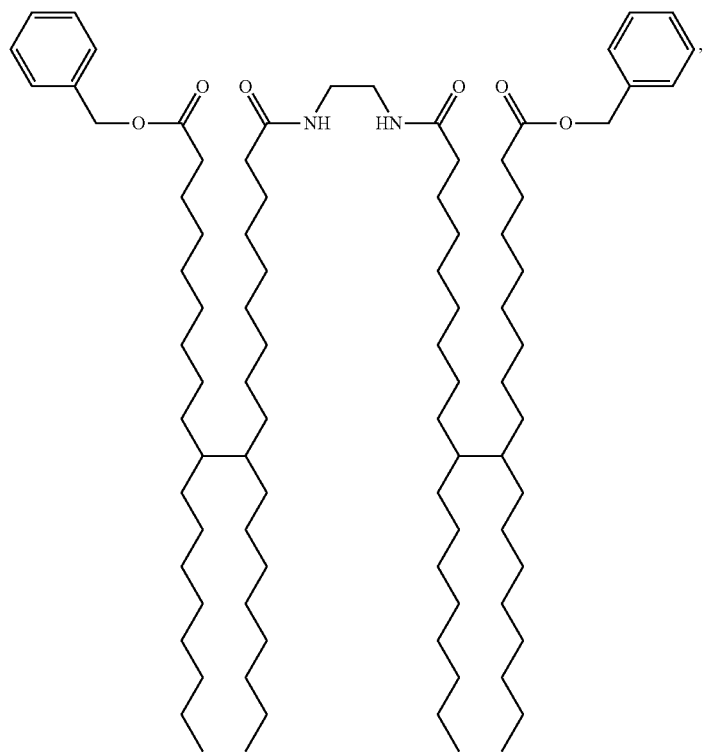
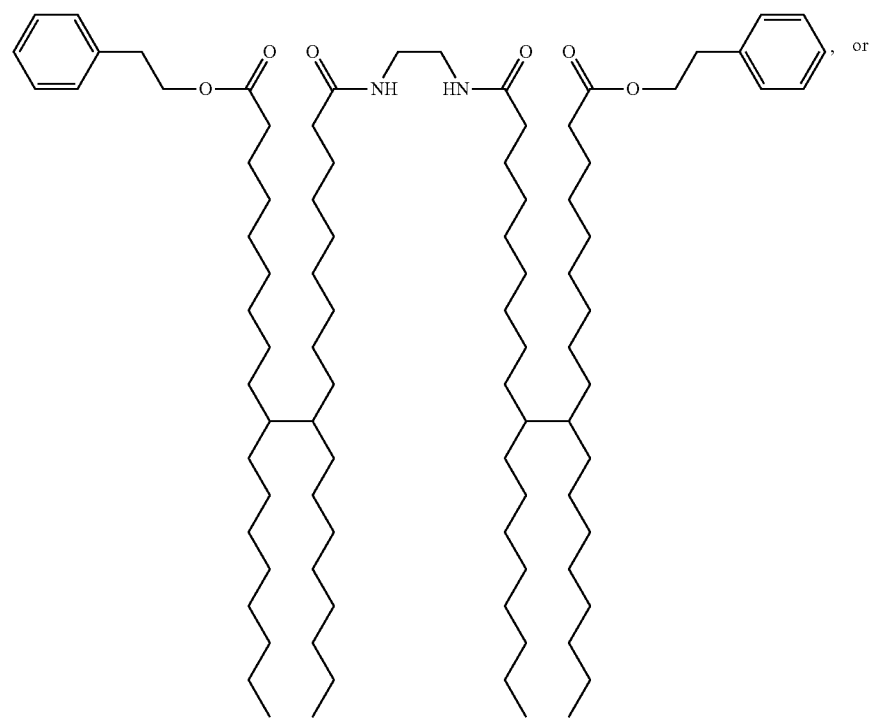, or

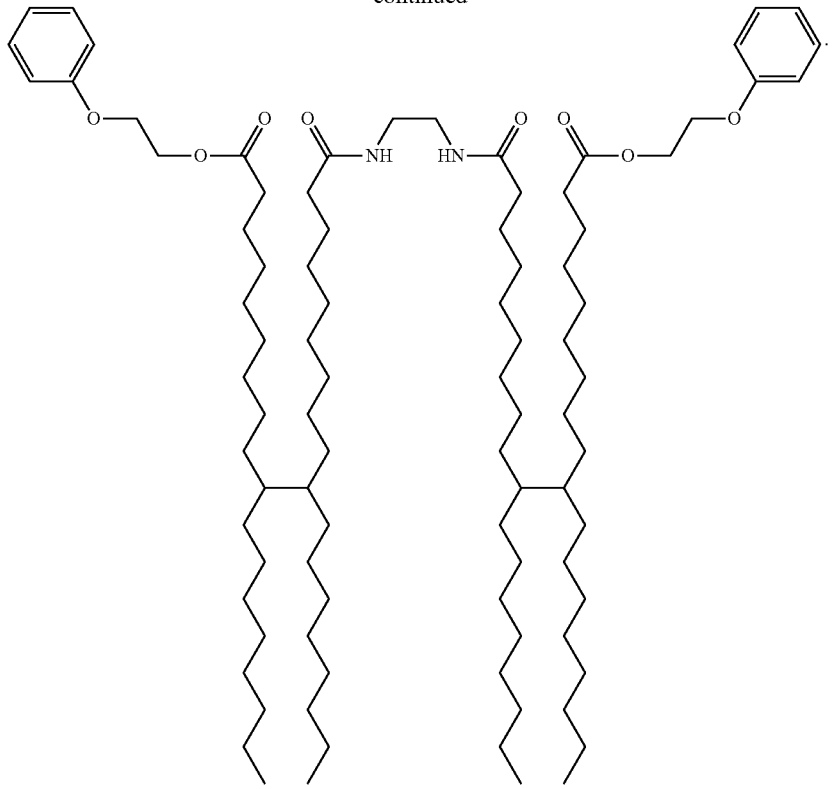

As mentioned above, the ink can include the gelling agent, or gellant, in any suitable amount, such as about 1 percent to about 50 percent or from about 2 percent to about 20 percent or from about 5 percent to about 15 percent by weight of the ink.

The non-curable solid components include non-curable waxes including ethoxylated octylphenol derivatives, which are soluble in the ink composition and/or have a melting point of about 5° C. to about 10° C. below jetting temperatures (which may range from about 70° C. to about 100° C.) so that the non-curable waxes homogenously combine with the other components of the ink composition. Furthermore, the molecular weight (MW) of ethoxylated octylphenol derivatives range from about 600 to about 5000 g/mole.

In the formulas for Derivatives A, B, C and D, R is a hydrocarbon chain in which the number of carbons range from 18 to 48, such as from 24 to 34 or from 28 to 30. In embodiments, in the formulas for Derivatives A, B, C and D, R is $CH_3-(CH_2)_n-$ where n is an integer between 17 and 47, such as where n is an integer between 23 and 33, or where n is either 27 or 29. In embodiments, the ethoxylated octylphenol derivatives may be a mixture of ethoxylated octylphenol derivates of one or more, such as two or three or four, of the above formulas for Derivatives A, B, C or D (where R is $CH_3-(CH_2)_n-$) in which the Derivatives present in the mixture comprise a range of integer values of n. For example, the ethoxylated octylphenol derivative mixture may include as its main component (the term "main component" refers, for example, to the component present in the highest proportion) a molecule of the formula for Derivatives A, B, C or D, where R is $CH_3-(CH_2)_n-$ and n is an integer between 17 and 47, such as where n is an integer between 23 and 33, or where n is either 27 or 29. Furthermore, the breadth of the range of integer values for n (of the Derivatives of the above formulas where R is $CH_3-(CH_2)_n-$) making up the distribution of molecules present in the mixture may also vary, such that the mixture of Derivative molecules is made up by molecules having an integer value of n in the range from 17 ($CH_3-(CH_2)_{17}-$) to 47 (R is $CH_3-(CH_2)_{47}-$), such as in the range from 23 (R is $CH_3-(CH_2)_{23}-$) to 33 (R is $CH_3-(CH_2)_{33}-$) or in the range from 27 (R is $CH_3-(CH_2)_{27}-$) to 29 (R is $CH_3-(CH_2)_{29}-$).

Reactants for the ethoxylated octylphenol derivatives may be selected from the Triton and IGEPAL CA series based on octylphenol ethoxylates, such as for example, IGEPAL CA-210 (equivalent to Triton X-15), IGEPAL CA-420 (equivalent to Triton X-35), IGEPAL CA-510 (equivalent to Triton X-45), IGEPAL CA-620 (equivalent to Triton X-114), IGEPAL CA-630 (equivalent to Triton X-100), IGEPAL CA-720 (equivalent to Triton X-102), IGEPAL CA-887 (equivalent to Triton X-305), IGEPAL CA-890 (equivalent to Triton X-405), IGEPAL CA-897 (equivalent to Triton X-705), as well as IGEPAL CO series (based on nonylphenol ethoxylation) such as IGEPAL CO210, IGEPAL CO520, IGEPAL CO630, IGEPAL CO720, IGEPAL CO890, and IGEPAL DM970 based on dinonylphenol ethoxylates.

The ethoxylated octylphenol derivatives may be prepared by mixing specific reactive components, for example, an ethoxylated octylphenol, a linear alcohol, and a diisocyanate and/or a polyisocyanate. These reactive components may include a linear alcohol having 38 or 30 carbons (sold under the tradename UNILIN 425); ethoxylated octylphenols, such as IGEPAL CA-210, IGEPAL CA-420, IGEPAL CA-520, IGEPAL CA-620, IGEPAL CA-630, and IGEPAL CA-720 (ethoxylated octylphenols sold under the tradename IGEPAL; formally manufactured by Rhone-Poulene Co. and currently manufactured by Rhodia; the Triton Series was formally manufactured by Union Carbied and currently manufactured by the Dow Chemical Company); diisocynates and polyisocyanates, including aromatic, aliphatic, cycloaliphatic and/or (cyclo)aliphatic diisocyanates and/or polyisocyanates. Suitable aliphatic diisocyanates or polyisocyanates may have 3 to 16 carbon atoms or 4 to 12 carbon atoms, in the linear or branched alkyl portion, and suitable cycloaliphatic or (cyclo)aliphatic diisocyanates may posses 4 to 18 carbon atoms or 6 to 15 carbon atoms, in the cylcoalkyl portion. The term "(cyclo)aliphatic diisocyanates" refers, for example, to NCO groups that are attached cyclically and aliphatically at the same time (such as isophorone diisocyanate); and cycloaliphatic diisocyanates include those which contain only NCO groups attached directly to the cycloaliphatic ring, such as $H_{12}MDI$. Suitable diisocyanates and polyisocyanates include, for example, those that are listed in U.S. patent application Ser. No. 12/704,194 to Breton et al., which is hereby incorporated by reference.

The inks were formulated using non-curable components and both commercial resin Licowax-KFO and the IGEPAL custom materials. In one embodiment, the non-curable component of the present embodiments, present in the range of 0 to 5 percent by weight in the ink, is an IGEPAL CA210 derivative or mixture of IGEPAL CA210 derivatives. Specific embodiments used the TMHDI and IPDI derivatives, melting respectively at 87° C. and 88° C.

The ink compositions may also contain a colorant. Any desired or effective colorant can be employed in the ink compositions, including dyes, pigments, mixtures thereof, and the like, provided that the colorant can be dissolved or dispersed in the ink vehicle and is compatible with the other ink components. Pigments, which are typically cheaper and more robust than dyes, may be included in the curable phase change ink composition. The color of many dyes can be altered by the polymerization process occurring during the curing stage, presumably from attack of their molecular structure by the free radicals. The compositions can be used in combination with conventional ink-colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Neozapon Red 492 (BASF); Orasol Red G (Ciba); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bernachrome Yellow GD Sub (Classic Dyestuffs); Cartasol Brilliant Yellow 4GF (Clariant); Cibanon Yellow 2GN (Ciba); Orasol Black CN (Ciba); Savinyl Black RLSN (Clariant); Pyrazol Black BG (Clariant); Morfast Black 101 (Rohm & Haas); Diaazol Black RN (ICI); Orasol Blue GN (Ciba); Savinyl Blue GLS (Clariant); Luxol Fast Blue MBSN (Pylam Products); Sevron Blue 5GMF (Classic Dyestuffs); Basacid Blue 750 (BASF), Neozapon Black X51 (BASF), Classic Solvent Black 7 (Classic Dyestuffs), Sudan Blue 670 (C.I. 61554) (BASF), Sudan Yellow 146 (C.I. 12700) (BASF), Sudan Red 462 (C.I. 26050) (BASF), C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the curable phase change inks. Examples of suitable pigments include PALIOGEN Violet 5100 (commercially available from BASF); PALIOGEN Violet 5890 (commercially available from BASF); HELIOGEN Green L8730 (commercially available from BASF); LITHOL Scarlet D3700 (commercially available from BASF); SUNFAST Blue 15:4 (commercially available from Sun Chemical); Hostaperm Blue B2G-D (commercially available from Clariant); Hostaperm Blue B4G (commercially available from Clariant); Permanent Red P-F7RK; Hostaperm Violet BL (commercially available from Clariant); LITHOL Scarlet 4440 (commercially available from BASF); Bon Red C (commercially available from Dominion Color Company); ORACET Pink RF (commercially available from Ciba); PALIOGEN Red 3871 K (commercially available from BASF); SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASF); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue K6902, K6910 (commercially available from BASF); SUNFAST Magenta 122 (commercially available from Sun Chemical); HELIOGEN Blue D6840, D7080 (commercially available from BASF); Sudan Blue OS (commercially available from BASF); NEOPEN Blue FF4012 (commercially available from BASF); PV Fast Blue 82001 (commercially available from Clariant); IRGALITE Blue BCA (commercially available from Ciba); PALIOGEN Blue 6470 (commercially available from BASF); Sudan Orange G (commercially available from Aldrich), Sudan Orange 220 (commercially available from BASF); PALIOGEN Orange 3040 (BASF); PALIOGEN Yellow 152, 1560 (commercially available from BASF); LITHOL Fast Yellow 0991 K (commercially available from BASF); PALIOTOL Yellow 1840 (commercially available from BASF); NOVOPERM Yellow FGL (commercially available from Clariant); Ink Jet Yellow 4G VP2532 (commercially available from Clariant); Toner Yellow HG (commercially available from Clariant); Lumogen Yellow DO790 (commercially available from BASF); Suco-Yellow L1250 (commercially available from BASF); Suco-Yellow DI355 (commercially available from BASF); Suco Fast Yellow DI355, DI351 (commercially available from BASF); HOSTAPERM Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL Pink D4830 (commercially available from BASF); CINQUASIA Magenta (commercially available from DU PONT); PALIOGEN Black L0084 (commercially available from BASF); Pigment Black K801 (commercially available from BASF); and carbon blacks such as REGAL 330™ (commercially available from Cabot), Nipex 150 (commercially available from Degussa) Carbon Black 5250 and Carbon Black 5750 (commercially available from Columbia Chemical), and the like, as well as mixtures thereof.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat No. 7,427,323, the disclosures of each of which are incorporated herein by reference in their entirety.

In embodiments, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), mixtures thereof and the like.

The colorant may be present in the ink in any desired or effective amount to obtain the desired color or hue such as, for example, at least from about 0.1 percent by weight of the ink to about 50 percent by weight of the ink, or from at least from about 0.2 percent by weight of the ink to about 20 percent by weight of the ink, or at least from about 0.5 percent by weight of the ink to about 10 percent by weight of the ink.

The curable phase change ink composition may optionally include an initiator, such as, for example, a photoinitiator. Such an initiator is desirable for assisting in curing of the ink. In embodiments, a photoinitiator that absorbs radiation, for example UV light radiation, to initiate curing of the curable components of the ink may be used. As the photoinitiator for ink compositions that are cured by free-radical polymerization, for instance, ink compositions containing acrylate groups or inks comprised of polyamides, mention may be made of photoinitiators such as benzophenones, benzoin ethers, benzil ketals, α-hydroxyalkylphenones, α-alkoxyalkylphenones α-aminoalkylphenones and acylphosphine photoinitiators sold under the trade designations of IRGACURE and DAROCUR from Ciba. Specific examples of suitable photoinitiators include 2,4,6-trimethylbenzoyldiphenylphosphine oxide (available as BASF LUCIRIN TPO); 2,4,6-trimethylbenzoylethoxyphenylphosphine oxide (available as BASF LUCIRIN TPO-L); bis(2,4,6-trimethylbenzoyl)-phenyl-phosphine oxide (available as Ciba IRGACURE 819) and other acyl phosphines; 2-methyl-1-(4-methylthio)phenyl-2-(4-morphorlinyl)-1-propanone (available as Ciba IRGACURE 907) and 1-(4-(2-hydroxyethoxy)phenyl)-2-hydroxy-2-methylpropan-1-one (available as Ciba IRGACURE 2959); 2-benzyl 2-dimethylamino 1-(4-morpholinophenyl)butanone-1 (available as Ciba IRGACURE 369); 2-hydroxy-1-(4-(4-(2-hydroxy-2-methylpropionyl)-benzyl)-phenyl)-2-methylpropan-1-one(available as Ciba IRGACURE 127); 2-dimethylamino-2-(4-methylbenzyl)-1-(4-morpholin-4-ylphenyl)-butanone(available as Ciba IRGACURE 379); titanocenes; isopropylthioxanthone; 1-hydroxy-cyclohexylphenylketone; benzophenone; 2,4,6-trimethylbenzophenone; 4-methylbenzophenone; diphenyl-(2,4,6-trimethylbenzoyl)phosphine oxide; 2,4,6-trimethylbenzoylphenylphosphinic acid ethyl ester; oligo(2-hydroxy-2-methy-1-(4-(1-methylvinyl)phenyl)propanone); 2-hydroxy-2-methyl-1-phenyl-1-propanone; benzyl-dimethylketal; and mixtures thereof. Mention may also be made of amine synergists, which are described as co-initiators that donate a hydrogen atom to a photoinitiator and thereby form a radical species that initiates polymerization (amine synergists can also consume oxygen dissolved in the ink—as oxygen inhibits free-radical polymerization its consumption increases the speed of polymerization), for example such as ethyl-4-dimethylaminobenzoate and 2-ethylhexyl-4-dimethylaminobenzoate. This list is not exhaustive, and any known photoinitiator that initiates the free-radical reaction upon exposure to a desired wavelength of radiation such as UV light can be used without limitation.

The photoinitiator may absorb radiation of about 200 to about 420 nm wavelengths in order to initiate cure, although use of initiators that absorb at longer wavelengths, such as the titanocenes that may absorb up to 560 nm, can also be used without restriction.

The total amount of initiator included in the ink composition may be from, for example, about 0.5 to about 15% by weight, such as from about 1 to about 10% by weight, of the ink composition.

In specific embodiments, the curable monomers may be present in the curable solid ink in an amount of from about 50 to about 95 percent, or from about 60 to about 90 percent by weight of the total weight of the curable solid ink. The curable wax may be present in the curable solid ink in an amount of from about 0.1 to about 30 percent of the total weight of the curable solid ink. The gellant may be present in the curable solid ink in an amount of from about 1 to about 30 percent, or from about 5 to about 10 percent by weight of the total weight of the curable solid ink. In a specific embodiment, the gellant is present in the curable solid ink in an amount of about 7 percent by weight of the total weight of the curable solid ink. The colorant may be present in the curable solid ink in an amount of from about 0.1 to about 10 percent, or from about 1 to about 5 percent by weight of the total weight of the curable solid ink. The photoinitiator may be present in the curable solid ink in an amount of from about 0.5 to about 15 percent, or from about 1 to about 10 percent by weight of the total weight of the curable solid ink.

In the present embodiments, there is further provided a method of using the curable solid ink for jet printing text. In such embodiments, the method comprises jetting a curable solid ink onto an intermediate substrate to form an intermediate image, transferring the intermediate image onto a substrate to form a transferred image, and exposing the transferred image to radiation having wavelengths in the range of from about 180 nanometers to about 500 nanometers to cure the curable solid ink. In embodiments, the jetting step is performed at above 70° C., or at from about 70 to about 100° C.

Any suitable printing device may used herein. In one embodiment, the apparatus is an ink jet printing device as described in commonly assigned, co-pending U.S. Patent Publication No. 2008/0218540, incorporated by reference in its entirety, that includes at least an ink jet print head and a print region surface toward which ink is jetted from the ink jet print head, wherein a height distance between the ink jet print head and the print region surface is adjustable.

The apparatus, as well as the methods herein, may be employed with any desired printing system and marking material suitable for applying a marking material in an imagewise pattern to an intermediate transfer member or directly to an image receiving substrate, piezoelectric ink jet printing (both with inks liquid at room temperature and with phase change inks), acoustic ink jet printing (both with inks liquid at room temperature and with phase change inks), thermal transfer printing, gravure printing, and the like. For the purpose of illustration, a piezoelectric phase change ink jet printer for applying marking material in an imagewise pattern to an intermediate transfer member is described.

FIG. 1 is an illustration of an example of a suitable imaging apparatus 10 for forming an image on an intermediate transfer member and subsequently transferring that image from the intermediate transfer member to a final image receiving substrate. The illustrated imaging apparatus 10 includes an intermediate transfer member 14. A marking material applicator, in this case an ink jet head, 11 applies marking material in an imagewise pattern 26 onto the surface 12 of the intermediate transfer member. This surface 12 is a print region surface toward which the ink jet head 11 jets the marking material in forming an image. In this illustrated case, the print region surface is the intermediate transfer member surface.

As also shown in FIG. 1, the apparatus may also include a transferring apparatus 61 including, for example, a transfer roll 22 where the imagewise pattern of marking material from the intermediate transfer member surface is transferred onto an image receiving substrate 18. An optional image receiving substrate guide 20 may be used to pass the image receiving substrate from a feed device (not shown) and guide the substrate through the nip formed by the opposing arcuate surfaces of the roll 22 and the intermediate transfer member 14. Optional stripper fingers 25 may be mounted to the imaging apparatus 10 to assist in removing the image receiving substrate from the surface of the intermediate transfer member 14. Roll 22 may have a metallic core 23, such as steel, with an elastomeric covering such as, for example, urethanes, nitrites, ethylene propylene diene monomer rubber (EPDM), and other appropriately resilient materials. Fusing of the image on the image receiving substrate may also be effected at this transferring apparatus. Once the image 26 enters the nip, it is transferred to its final image conformation and adheres or is fixed to the image receiving substrate either by the pressure exerted against the image 26 on the substrate 18 by the roll 22 alone, or by the combination of the pressure and heat supplied by optional heater 21 and/or optional heater 19. Optional heater 24 may also be employed to supply heat to facilitate the process at this point. Once adhered and/or fused to the image receiving substrate, the image is cooled to ambient temperature, for example from about 22 to about 27° C.

Figure 2:
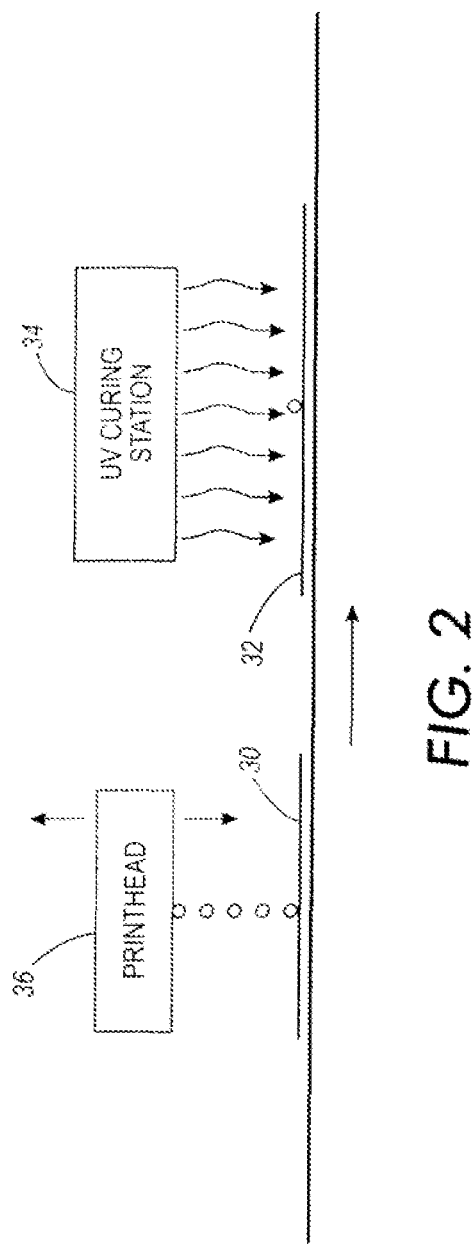
FIG. 2 is a schematic depiction Of an embodiment including depositing the present marking material directly to a substrate according to the present embodiments.

However, in embodiments wherein the marking material is jetted from a printhead 36 directly to an image receiving substrate 30 such as paper, the print region surface would be the surface of the image receiving substrate 30, as shown in FIG. 2. The substrate 30 can then move along belt 32 in the direction shown by the single arrow toward the UV curing station 34 where the printed image is cured. Various embodiments are contemplated herein including comprising, for example, multiple passes through a single printing and curing station, several printing and curing stations disposed successively in turn, among others.

Radiation curable phase change inks generally comprise at least one curable monomer, a gellator, a colorant, and a radiation activated initiator, specifically a photoinitiator, that initiates polymerization of curable components of the ink, specifically of the curable monomer. U.S. Pat. No. 7,279,587 to Odell et al., the disclosure of which is totally incorporated herein by reference, discloses photoinitiating compounds useful in curable solid ink compositions. U.S. Patent Publication 2007/0120910 to Odell et al., which is hereby incorporated by reference herein in its entirety, describes, in embodiments, a solid ink comprising a colorant, an initiator, and an ink vehicle.

In specific embodiments, the ink vehicles disclosed herein can comprise any suitable curable monomer or prepolymer. The curable monomer or prepolymer and curable wax together can form more than about 50 percent, or at least 70 percent, or at least 80 percent by weight of the ink. Examples of suitable materials include radically curable monomer compounds, such as acrylate and methacrylate monomer compounds, which are suitable for use as phase change ink carriers. Specific examples of relatively nonpolar acrylate and methacrylate monomers include (but are not limited to) isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, and the like, as well as mixtures and combinations thereof. In addition, multifunctional acrylate and methacrylate monomers and oligomers can be included in the phase change ink carrier as reactive diluents and as materials that can increase the crosslink density of the cured image, thereby enhancing the toughness of the cured images. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl)isocyanurate triacrylate, propoxylated neopentyl glycol diacrylate (available from Sartomer Co. Inc. as SR 9003), hexanediol diacrylate, tripropylene glycol diacrylate, dipropylene glycol diacrylate, amine modified polyether acrylates (available as PO 83 F, LR 8869, and/or LR 8889 (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494), and the like, as well as mixtures and combinations thereof. When a reactive diluent is added to the ink carrier material, the reactive diluent is added in any desired or effective amount, for example, from about 1 percent to about 80 percent by weight of the carrier, or from about 35 percent to about 70 percent by weight of the carrier, although the amount of diluent can be outside of these ranges.

In specific embodiments, the ink vehicles disclosed herein can comprise any suitable photoinitiator. Examples of specific initiators include, but are not limited to, IRGACURE® 127, IRGACURE® 379, and IRGACURE® 819, all commercially available from Ciba Specialty Chemicals, among others. Further examples of suitable initiators include (but are not limited to) benzophenones, benzophenone derivatives, benzyl ketones, α-alkoxy benzyl ketones, monomeric hydroxyl ketones, polymeric hydroxyl ketones, α-amino ketones, alkoxy ketones, acyl phosphine oxides, metallocenes, benzoin ethers, benzil ketals, α-hydroxyalkylphenones, α-aminoalkylphenones, acylphosphine photoinitiators sold under the trade designations of IRGACURE® and DAROCUR® from Ciba, and the like. Specific examples include 1-hydroxy-cyclohexylphenylketone, benzophenone, 2-benzyl-2-(dimethylamino)-1-(4-(4-morphorlinyl)phenyl)-1-butanone, 2-methyl-1-(4-methylthio)phenyl-2-(4-morphorlinyl)-1-propanone, diphenyl-(2,4,6-trimethylbenzoyl)phosphine oxide, phenyl bis(2,4,6-trimethylbenzoyl)phosphine oxide, benzyl-dimethylketal, isopropylthioxanthone, 2,4,6-trimethylbenzoyldiphenylphosphine oxide (available as BASF LUCIRIN® TPO), 2,4,6-trimethylbenzoylethoxyphenylphosphine oxide (available as BASF LUCIRIN® TPO-L), bis(2,4,6-trimethylbenzoyl)-phenyl-phosphine oxide (available as Ciba IRGACURE® 819) and other acyl phosphines, 2-methyl-1-(4-methylthio)phenyl-2-(4-morphorlinyl)-1-propanone (available as Ciba IRGACURE® 907) and 1-(4-(2-hydroxyethoxy)phenyl)-2-hydroxy-2-methylpropan-1-one (available as Ciba IRGACURE® 2959), 2-benzyl 2-dimethylamino1-(4-morpholinophenyl)butanone-1(available as Ciba IRGACURE® 369), 2-hydroxy-1-(4-(4-(2-hydroxy-2-methylpropionyl)-benzyl)-phenyl-2-methylpropan-1-one (available as Ciba IRGACURE® 127), 2-dimethylamino-2-(4-methylbenzyl)-1-(4-morpholin-4-ylphenyl)-butanone (available as Ciba IRGACURE® 379), titanocenes, isopropylthioxanthone, 1-hydroxy-cyclohexylphenylketone, benzophenone, 2,4,6-trimethylbenzophenone, 4-methylbenzophenone, diphenyl-(2,4,6-trimethylbenzoyl)phosphine oxide, 2,4,6-trimethylbenzoylphenylphosphinic acid ethyl ester, oligo(2-hydroxy-2-methyl-1-(4-(1-methylvinyl)phenyl)propanone), 2-hydroxy-2-methyl-1-phenyl-1-propanone, benzyl-dimethylketal, arylsulphonium slats, aryl iodonium salt, and the like, as well as mixtures thereof.

Optionally, the phase change inks can also contain an amine synergist, which are co-initiators which can donate a hydrogen atom to a photoinitiator and thereby form a radical species that initiates polymerization, and can also consume dissolved oxygen, which inhibits free-radical polymerization, thereby increasing the speed of polymerization. Examples of suitable amine synergists include (but are not limited to) ethyl-4-dimethylaminobenzoate, 2-ethylhexyl-4-dimethylaminobenzoate, and the like, as well as mixtures thereof.

Initiators for inks disclosed herein can absorb radiation at any desired or effective wavelength, for example, from about 4 nanometers to about 560 nanometers, or from about 200 nanometers to about 560 nanometers, or from about 200 nanometers to about 420 nanometers, although the wavelength can be outside of these ranges.

Optionally, the photoinitiator is present in the phase change ink in any desired or effective amount, for example from about 0.5 percent to about 15 percent by weight of the ink composition, or from about 1 percent to about 10 percent by weight of the ink composition, although the amount can be outside of these ranges.

The ink of embodiments may further include conventional additives to take advantage of the known functionality associated with such conventional additives. Such additives may include, for example, at least one isocyanate derived material, antioxidant, defoamer, slip and leveling agents, clarifier, viscosity modifier, adhesive, plasticizer and the like.

The ink vehicle or carrier may also include at least one isocyanate derived material. The isocyanate derived material may be a urethane resin obtained by reacting two equivalents of an alcohol, such as hydroabietyl alcohol and one equivalent of an isocyanate or diisocyanate (isophorone diisocyanate), as disclosed in, for example, Example 1 of U.S. Pat. No. 5,782,966, the disclosure of which is totally incorporated herein by reference in its entirety. The isocyanate derived material may be present in the ink carrier in an amount of from about 0.5 to about 30 percent or from about 0.5 to about 20 percent or from about 1 to about 15 percent by weight of the ink carrier. Other suitable isocyanate-derived materials include a urethane resin that was the adduct of three equivalents of stearyl isocyanate and a glycerol-based alcohol, prepared as described in Example 4 of U.S. Pat. No. 6,309,453, the disclosure of which is totally incorporated herein by reference in its entirety.

The ink may optionally contain antioxidants to protect the images from oxidation and also may protect the ink components from oxidation while existing as a heated melt in the ink reservoir. Examples of suitable antioxidants include (1) N,N'-hexamethylene bis(3,5-di-tert-butyl-4-hydroxyhydrocinnamamide) (IRGANOX 1098, available from Ciba Inc.), (2) 2,2-bis(4-(2-(3,5-di-tert-butyl-4-hydroxyhydrocinnamoyloxy))ethoxyphenyl)propane (TOPANOL-205, available from ICI America Corporation), (3) tris(4-tert-butyl-3-hydroxy-2,6-dimethyl benzyl)isocyanurate (CYANOX 1790, 41, 322-4, LTDP, Aldrich D12,840-6), (4) 2,2'-ethylidene bis(4,6-di-tert-butylphenyl)fluoro phosphonite (ETHANOX-398, available from Ethyl Corporation), (5) tetrakis(2,4-di-tert-butylphenyl)-4,4'-biphenyl diphosphonite (ALDRICH 46,852-5; hardness value 90), (6) pentaerythritol tetrastearate (TCI America #P0739), (7) tributylammonium hypophosphite (Aldrich 42,009-3), (8) 2,6-di-tert-butyl-4-methoxyphenol (Aldrich 25,106-2), (9) 2,4-di-tert-butyl-6-(4-methoxybenzyl)phenol (Aldrich 23,008-1), (10) 4-bromo-2,6-dimethylphenol (Aldrich 34,951-8), (11) 4-bromo-3,5-didimethylphenol (Aldrich B6,420-2), (12) 4-bromo-2-nitrophenol (Aldrich 30,987-7), (13) 4-(diethyl aminomethyl)-2,5-dimethylphenol (Aldrich 14,668-4), (14) 3-dimethylaminophenol (Aldrich ID14,400-2), (15) 2-amino-4-tert-amylphenol (Aldrich 41,258-9), (16) 2,6-bis (hydroxymethyl)-p-cresol (Aldrich 22,752-8), (17) 2,2'-methylenediphenol (Aldrich B4,680-8), (18) 5-(diethylamino)-2-nitrosophenol (Aldrich 26,951-4), (19) 2,6-dichloro-4-fluorophenol (Aldrich 28,435-1), (20) 2,6-dibromo fluoro phenol (Aldrich 26,003-7), (21) α-trifluoro-o-creso-1 (Aldrich 21,979-7), (22) 2-bromo-4-fluorophenol (Aldrich 30,246-5), (23) 4-fluorophenol (Aldrich F1,320-7), (24) 4-chlorophenyl-2-chloro-1,1,2-tri-fluoroethyl sulfone (Aldrich 13,823-1), (25) 3,4-difluoro phenylacetic acid (Adrich 29,043-2), (26) 3-fluorophenylacetic acid (Aldrich 24,804-5), (27) 3,5-difluoro phenylacetic acid (Aldrich 29,044-0), (28) 2-fluorophenylacetic acid (Aldrich 20,894-9), (29) 2,5-bis (trifluoromethyl)benzoic acid (Aldrich 32,527-9), (30) ethyl-2-(4-(4-(trifluoromethyl)phenoxy)phenoxy)propionate (Aldrich 25,074-0), (31) tetrakis (2,4-di-tert-butyl phenyl)-4,4'-biphenyl diphosphonite (Aldrich 46,852-5), (32) 4-tert-amyl phenol (Aldrich 15,384-2), (33) 3-(2H-benzotriazol-2-yl)-4-hydroxy phenethylalcohol (Aldrich 43,071-4), NAUGARD 76, NAUGARD 445, NAUGARD 512, AND NAUGARD 524 (manufactured by Chemtura Corporation), and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

The ink may further contain an optional viscosity modifier such as FORAL 85, a glycerol ester of hydrogenated abietic (rosin) acid (commercially available from Eastman), FORAL 105, a pentaerythritol ester of hydroabietic (rosin) acid (commercially available from Eastman), CELLOLYN 21, a hydroabietic (rosin) alcohol ester of phthalic acid (commercially available from Eastman), ARAKAWA KE-311 and KE-100 Resins, triglycerides of hydrogenated abietic (rosin) acid (commercially available from Arakawa Chemical Industries, Ltd.), synthetic polyterpene resins such as NEVTAC 2300, NEVTAC 100, and NEVTACO 80 (commercially available from Neville Chemical Company), WINGTACK 86, a modified synthetic polyterpene resin (commercially available from Sartomer), and the like. Viscosity modifiers may be present in the ink in any effective amount, such as from about 0.01 percent by weight of the ink to from about 98 percent by weight of the ink, from about 0.1 percent by weight of the ink to about 50 percent by weight of the ink, from about 5 weight percent of the ink to about 10 weight percent of the ink.

Adhesives, such as VERSAMID 757, 759, or 744 (commercially available from Cognis) may be present in the ink from about 0.01 percent by weight of the ink to from about 98 percent by weight of the ink, from about 0.1 percent by weight of the ink to about 50 percent by weight of the ink, from about 5 weight percent of the ink to about 10 weight percent of the ink.

Plasticizers such as UNIPLEX 250 (commercially available from Unitex), the phthalate ester plasticizers commercially available from Ferro under the trade name SANTICIZER, such as dioctyl phthalate, diundecyl phthalate, alkylbenzyl phthalate (SANTICIZER 278), triphenyl phosphate (commercially available from Ferro), KP-140, a tributoxyethyl phosphate (commercially available from Great Lakes Chemical Corporation), MORFLEX 150, a dicyclohexyl phthalate (commercially available from Morflex Chemical Company Inc.), trioctyl trimellitate (commercially available from Sigma Aldrich Co.), and the like. Plasticizers may be present in an amount from about 0.01 percent by weight of the ink to from about 98 percent by weight of the ink, from about 0.1 percent by weight of the ink to about 50 percent by weight of the ink, from about 5 weight percent of the ink to about 10 weight percent of the ink.

When present, the optional additives may each, or in combination, be present in the ink in any desired or effective amount, such as from about 1 percent to about 10 percent by weight of the ink or from about 3 percent to about 5 percent by weight of the ink.

The ink compositions can be prepared by any desired or suitable method. For example, each of the components of the ink carrier can be mixed together, followed by heating, the mixture to at least its melting point, for example from about 60° C. to about 110° C., 80° C. to about 100° C. and 85° C. to about 95° C. The colorant may be added before the ink ingredients have been heated or after the ink ingredients have been heated. When pigments are the selected colorants, the molten mixture may be subjected to grinding in an attritor or ball mill apparatus to effect dispersion of the pigment in the ink carrier. The heated mixture is then stirred for about 5 seconds to about 30 minutes or more, to obtain a substantially homogeneous, uniform melt, followed by cooling the ink to ambient temperature (typically from about 20° C. to about 25° C.). The inks are solid at ambient temperature. In a specific embodiment, during the formation process, the inks in their molten state are poured into molds and then allowed to cool and solidify to form ink sticks. Suitable ink preparation techniques are disclosed in U.S. Pat. No. 7,186,762, the disclosure of which is incorporated herein by reference in its entirety.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Gloss, Sappi Warren Papers LUSTROGLOSS, specialty papers such as Xerox DURAPAPER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Preparation of Solid Inks

From the ink materials described above (e.g., curable waxes, monomers, gellants, optional colorants, and free-radical photoinitiators, and optional non-curable resins) numerous colorless and pigmented magenta curable solid inks were formulated to demonstrate unexpected results of the present embodiments.

Into a 30 mL amber glass bottle, was added in proportion the ink components in the following order: CD406, SR368, CD587, all available from Sartomer Co. Inc., Unilin 350 Acrylate, a gellant, IGEPAL A, IRGACURE 819, IRGACURE 184, IRGACURE 379 and IRGACURE 907, to obtain a total of 10 g of ink. To this 10 g mixture was added a stir bar and the mixture was placed in a Variomag reaction block. The ink mixture was heated and stirred at about 90° C., and 300 RPM respectively for at least 20 minutes or until the mixture appeared homogeneous. The temperature was increased to 100° C. for about 5 minutes. The mixture was brought back down to 90° C. and left to stir for 90 minutes.

Amide Gellant as described in U.S. Patent Publication 2010/0242790A1, which is hereby incorporated by reference herein in its entirety, was prepared as follows: Organoamide synthesis. An organoamide was prepared according to the following reaction scheme.

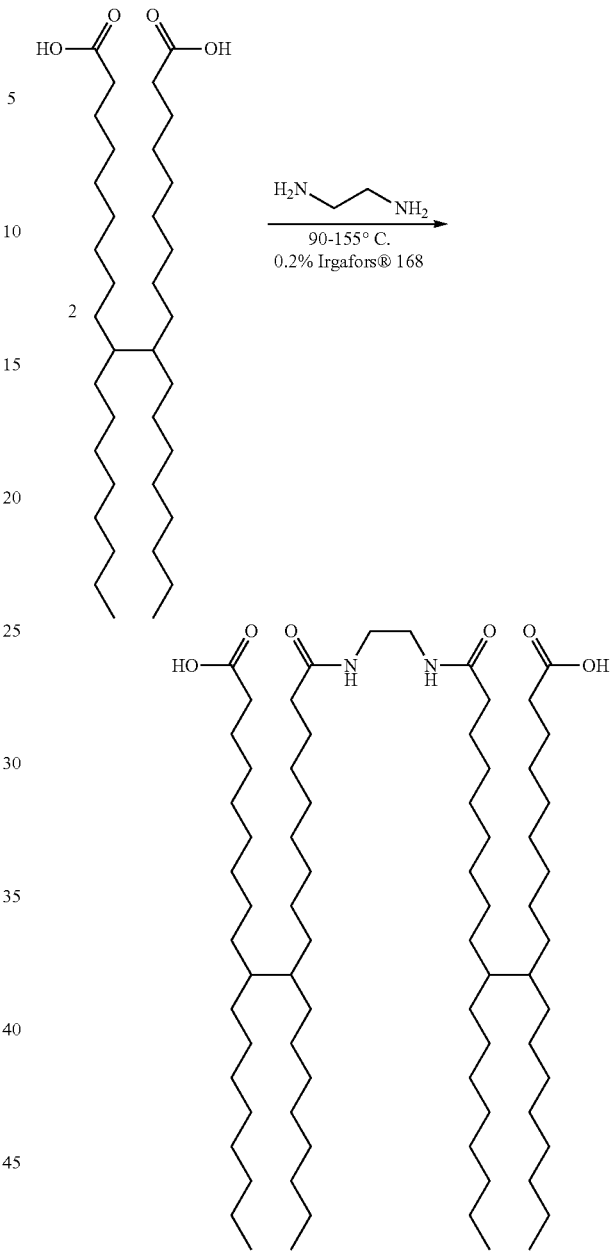

To a 2 liter kettle equipped with a 4-bladed PTFE (polytetrafluoroethylene) impeller, dropping funnel, Dean-Stark trap, reflux condenser, and thermocouple proved was added 1035.33 grams (1790 millimoles) of Pripol® 1009 dimer diacid (Uniqema, New Castle, Del.) of the formula $C_{36}H_{70}O_4$ as shown above. [The acid number was 194 milligrams KOH/ g, calculated molecular weight (MW) is 1000/[0.5[(acid#/ MW KOH)]=578.03, or 98% active.] Next, 2.07 grams of Irgafos® 168 (0.2 weight %) trisarylphosphite processing stabilizer (Ciba®) was added with mixing, and the kettle was purged with Argon. The kettle was heated to 90° C. 60.4 milliliters (895 millimoles) of ethylenediamine was added to the dropping funnel, and slowly added to the Pripol® 1009 dimer diacid dropwise over a period of 30 minutes. The kettle was heated to 150° C. and wrapped with cotton wool and foil to maintain temperature. Water began to collect in the trap (15 milliliters) and vapor was seen emanating from the condenser top. After 2 hours at 150° C., the heat was turned off, and the molten organoamide was poured into aluminum pie plates to cool and harden. 1,043.6 grams of organoamide was isolated.

Gellant synthesis.

An amide gellant was prepared according to the following reaction scheme.

photoinitiator, Ciba Specialty Chemicals), with mixing at room temperature. After __18 hours, DCHU (dicyclohexylurea) byproduct was filtered off and the dichloromethane solvent was removed by rotary evaporation rotovapped off. The product was transferred to a large foil pan and dried in a vacuum oven for 3 hours at 50° C. Acid #: 0.65. Amine #:

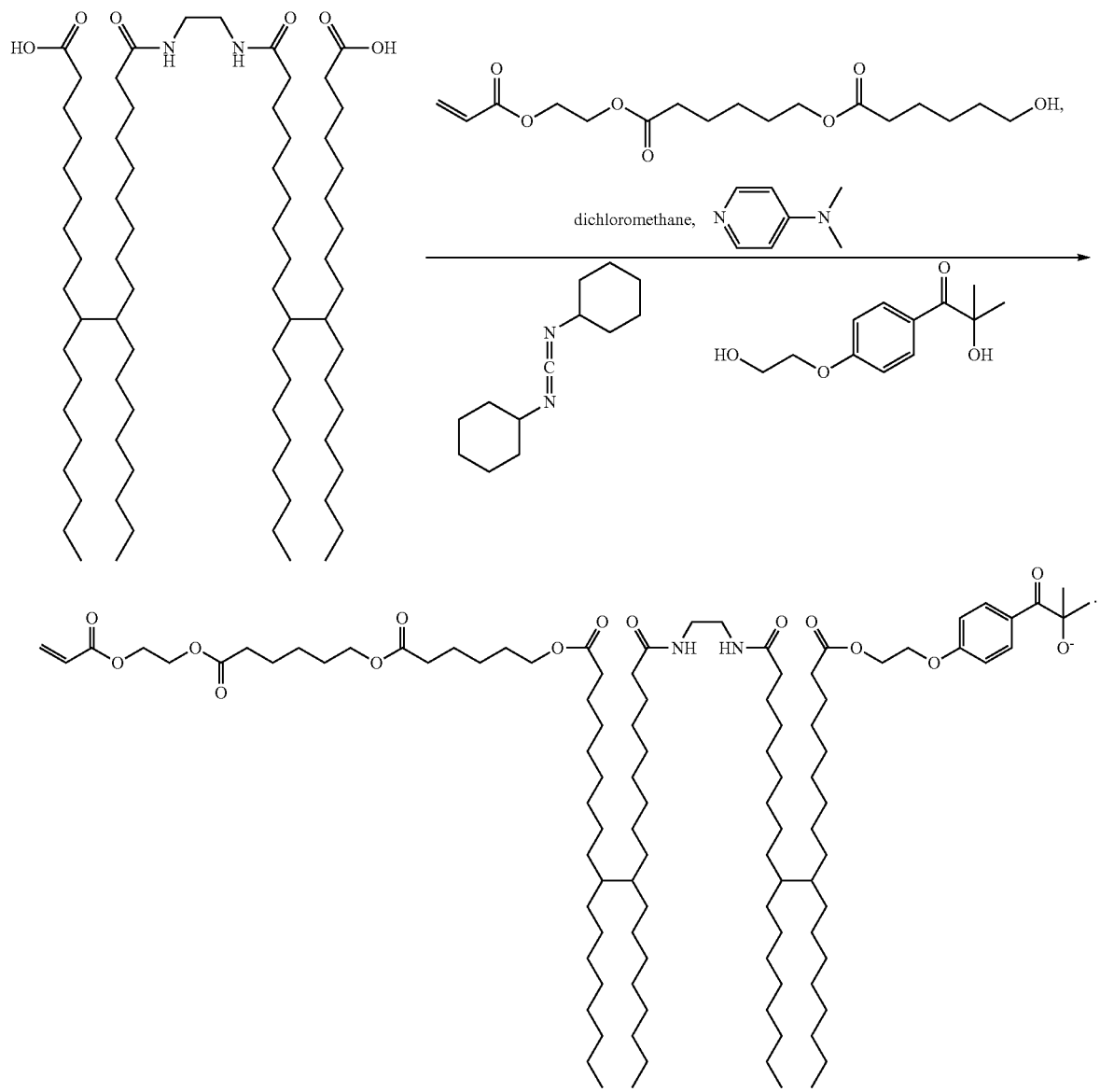

To a 20 liter reaction flask equipped with an overhead stirrer (metal spiral mixer) was added 936 grams (808 millimoles) of the above described organoamide, the transfer aided by the use of a hot air gun to melt the material into a flowable state. Next, 15 liters of dichloromethane was added, and the mixture was allowed to soak overnight with mixing to complete the dissolution of the organoamide starting material. Next, 400 grams (1,940 millimoles) of dicyclohexylcarbodiimide (DCC, coupling agent), 14.81 grams (121 millimoles) of 4-dimethylaminopyridine (DMAP, catalyst), 278 grams (808 millimoles) of SR495B® (caprolactone acrylate, Sartomer), 181 grams (808 millimoles) of Irgacure® 2959 (4-(2-hydroxyethoxy)phenyl-(2-hydroxy-2-propyl)ketone 3.87. The product was vacuum dried for an additional 8 hours at 50° C. % solids analysis (30 minutes at 80° C.) shows 2 weight % dichloromethane present. 1,438.3 grams of amide gellant were isolated.

Unilin® 350 acrylate is a curable monofunctional acrylate wax available from Baker Petrolite, (C22, C23, C24 mixture, melting point about 78 to about 83 C). Unilin® 350 can be used as received or synthesized as described in U.S. Pat. No. 7,559,639, which is hereby incorporated by reference herein in its entirety;

Derivative A is an ethoxylated octylphenol derivative described hereinabove and prepared as follows. To a 250 milliliter flask equipped with a stir magnet was charged a premelted mixture of 70 grams of IGEPAL® CA210, (MW=261) an ethoxylated octylphenol formerly manufactured by Rhone-Poulenc Co. and currently manufactured by Rhodia, and 80 grams of Unilin® 425 (OH #95.3, MW=589), a fully saturated, long chain, linear primary alcohol available from Baker Hughes. The flask was placed in a 140° C. oil bath with thermometer, and heated and stirred. After about 5 minutes, 30 grams of IPDI (MW=222) of the formula

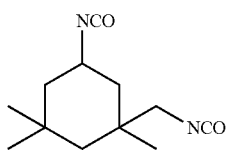

IPDI was added, followed by three drops of Fascat® 4202 dibutyltin dilaurate catalyst, of the formula $Bu_2Sn(OOC_{12}H_{23})_2$, available from Arkema Inc. An exotherm was observed. After about 1.5 hours, an IR spectrum was obtained on the reaction product and no isocyanate peak (about 2230 $cm^{-1}$) was observed. The contents were poured into aluminum tins and allowed to cool and solidify.

Four different formulations of a curable solid ink with gellant and non-curable component were prepared according to Table 1 below.

TABLE 1

| Sample Ingredients (g) | G1 | G2 | G3 | G4 |
|---|---|---|---|---|
| Monomer | | | | |
| CD406 | 6.334 | 6.299 | 6.264 | 6.351 |
| SR368 | 0.683 | 0.648 | 0.613 | 0.700 |
| CD587 | 0.683 | 0.648 | 0.613 | 0.700 |
| Curable Wax | | | | |
| Unilin 350 acrylate | 1.067 | 1.067 | 1.067 | 1.067 |
| Non-Curable Wax | | | | |
| Derivative A | 0.053 | 0.158 | 0.263 | 0.000 |
| Amide Gellant | 0.686 | 0.686 | 0.686 | 0.686 |
| Cationic Curable Photoinitiator | | | | |
| I819 | 0.160 | 0.160 | 0.160 | 0.160 |
| I184 | 0.231 | 0.231 | 0.231 | 0.231 |
| E I907 | 0.103 | 0.103 | 0.103 | 0.103 |
| Total (g) | 10.00 | 10.00 | 10.00 | 10.00 |

Hardness Measurement

The pre- and post-cure hardness of the ink vehicles were obtained with a PTC Durometer, as shown in Table 2. As a reference, on this instrument, the hardness of a commercial solid ink is about 67.

TABLE 2

| Responses | Range |
|---|---|
| Pre-Cured Hardness | 0.1-0.5 |
| Post-Cured Hardness | 91.8-93.7 |
| Initial Slope (ft/s) | 176.5-253.1 |

Cure Rate Measurement:

The cure rate was obtained by measuring the variation of hardness versus UV light exposure. A 600 W Fusion UV Systems Inc. Lighthammer equipped with a D-bulb was used to irradiate the vehicles and hardness was measured after specific exposure times. The hardness versus cure time (s/ft) plot was used to obtain the initial curing rate for the ink vehicle.

It was demonstrated that the curable solid ink comprising the gellant and non-curable component can be formulated with hardness greater than 90 which is a significant improvement over conventional solid inks, which have hardness less than 70.

Figure 3:
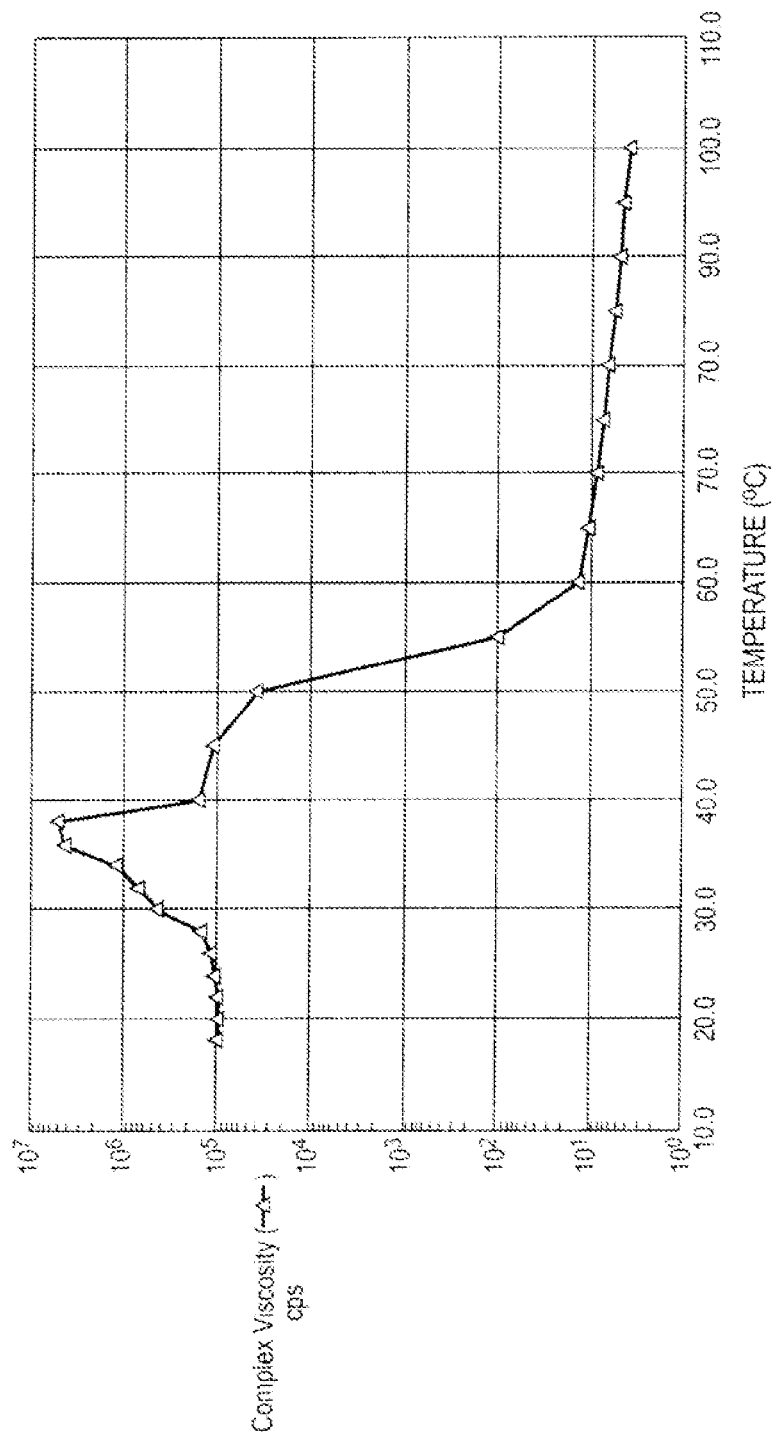
FIG. 3 is a graph illustrating complex viscosity versus temperature of a solid ink according to the present embodiments.

In FIG. 3, a typical viscosity versus temperature curve is shown for one of the ink formulations, clearly showing that the solid ink of the present embodiments meets jetting requirements for inkjet printers, such as for example, XEROX piezo printheads. This ink contains 63.34% CD406; 6.83% SR368; 6.83% CD587; and 0.53% Igepal A, with all the other components being present in the amount shown in the table above.

A curable solid ink with gellant based on Table 1, but having no other non-curable components, shown in Table 3, also resulted in excellent post-cure hardness (93.8) while maintaining high cure rates.

TABLE 3

| Component | Weight (g) |
|---|---|
| Monomer | |
| CD406 | 6.351 |
| SR368 | 0.561 |
| CD587 | 0.561 |
| Curable Wax | |
| Unilin 250 Acrylate | 1.067 |
| Amide Gellant | .686 |
| Photoinitiator | |
| Irgacure 819 | .160 |
| Irgacure 184 | .231 |
| Iragcuare 907 | .103 |
| Total | 10 |

Figure 4:
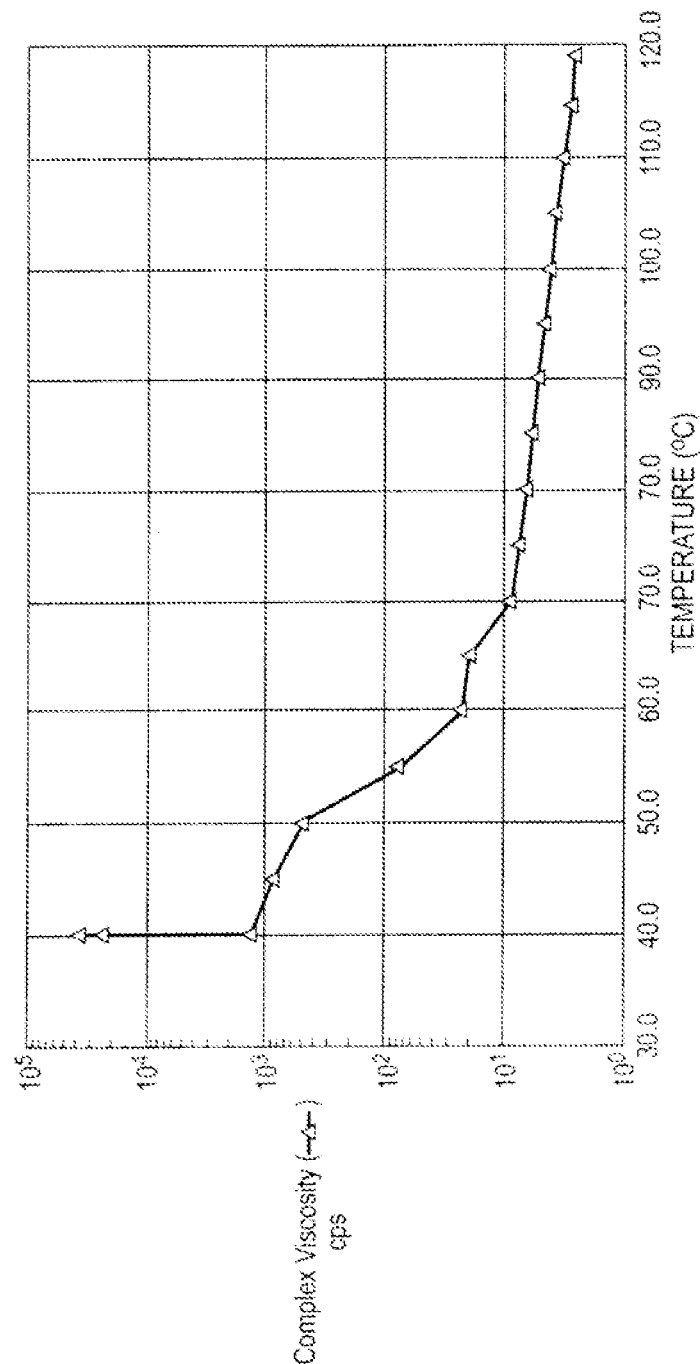
FIG. 4 is a graph illustrating complex viscosity versus temperature of alternative solid ink according to the present embodiments.

Rheology data suggest that this ink is jettable even at 70-80° C. versus the previous formulations (90° C. jetting), as shown in FIG. 4. Hardness measurements of this ink are shown in Table 4.

TABLE 4

| Responses | Range |
|---|---|
| Pre-Cured Hardness | 1.3 |
| Post-Cured Hardness | 93.8 |
| Initial Slope (ft/s) | 240.8 |

Hardness and curing rate data were obtained from Hardness versus Exposure Time plots using following expressions:

$$y = m_1 + m_2 \cdot (1 - \exp(-m_3 \cdot x))$$

Initial Hardness = $m_1$

Initial Slope = $m_2 \cdot m_3$

Final Hardness = $m_1 + m_2$

Printing Demonstration:

The inks of the present embodiments met the viscosity requirements for jettability in a modified XEROX PHASER printer equipped with a solid ink printhead (Frequency=36 Khz, jetting T=95.0° C., 355×464 dpi).

Summary

In summary, the present embodiments provide curable solid inks that retain the advantages of handling and safety associated with solid, phase change inks but provide additional breakthrough performance with respect to robustness after cure measured at greater than 90 in all tested examples.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A curable solid ink comprising:
   a curable wax;
   one or more monomers;
   an optional colorant;
   a curable amide gellant;
   a non-curable component comprising an ethoxylated octylphenol derivative prepared by mixing a diisocyanate, an ethoxylated octyl phenol, and a linear alcohol; and
   a photoinitiator.

2. The curable solid ink of claim 1, wherein the ethoxylated octylphenol derivative has a melting point of from about 60° C. to about 95° C. and has a molecular weight (MW) of from about 600 to about 5000 g/mole.

3. The curable solid ink of claim 1 having a pre-cured hardness of from about 0.1 to about 10.

4. The curable solid ink of claim 3 having a pre-cured hardness of from about 0.1 to about 0.5.

5. The curable solid ink of claim 1 having a post-cured hardness of from about 70 to about 95.

6. The curable solid ink of claim 5 having a post-cured hardness of from about 90 to about 95.

7. The curable solid ink of claim 1 having a viscosity of from about 5 to about 25 at a jetting temperature of from about 70 to about 100° C.

8. The curable solid ink of claim 7 having a viscosity of from about 8 to about 12 at a jetting temperature of from about 70 to about 100° C.

9. The curable solid ink of claim 1 being solid at from about 20 to about 27° C.

10. The curable solid ink of claim 1, wherein the curable wax is present in the curable solid ink in an amount of from about 0.1 to about 30 percent by weight of the total weight of the curable solid ink.

11. The curable solid ink of claim 1, wherein the one or more monomers are present in the curable solid ink in an amount of from about 50 to about 95 percent by weight of the total weight of the curable solid ink.

12. The curable solid ink of claim 1, wherein the optional colorant is present in the curable solid ink in an amount of from about 0.1 to about 10 percent by weight of the total weight of the curable solid ink.

13. The curable solid ink of claim 1, wherein the amide gellant is present in the curable solid ink in an amount of from about 1 to about 30 percent by weight of the total weight of the curable solid ink.

14. The curable solid ink of claim 1, wherein the photoinitiator is present in the curable solid ink in an amount of from about 0.5 to about 15 percent by weight of the total weight of the curable solid ink.

15. A curable solid ink comprising:
    a curable wax;
    one or more monomers;
    an optional colorant;
    a curable amide gallant;
    a non-curable component comprising an ethoxylated octylphenol derivative prepared by mixing a diisocyanate, an ethoxylated octyl phenol, and a linear alcohol; and
    a photoinitiator, wherein the curable solid ink has a hardness after curing of greater than 90 and a shrinkage value upon cooling from liquid state of less than 3.

16. The curable solid ink of claim 15 having jettable viscosities at above 70° C.

17. The curable solid ink of claim 16 having jettable viscosities at from about 70 to about 100° C.

18. A method of jet printing an image, comprising:
    jetting a curable solid ink onto a print substrate to form an image; and
    exposing the image to radiation to cure the curable solid ink on to the print substrate, wherein the curable solid ink comprises: an ink vehicle, one or more waxes, and a photoinitiator, wherein the curable solid ink comprises
    a curable wax,
    one or more monomers,
    an optional colorant,
    a curable amide gellant;
    a non-curable component comprising an ethoxylated octylphenol derivative prepared by mixing a diisocyanate, an ethoxylated octyl phenol, and a linear alcohol; and
    a photoinitiator, wherein the curable solid ink has a hardness after curing of greater than 90 and a shrinkage value upon cooling from liquid state of less than 3.

* * * * *